3,804,814
VINYL CHLORIDE COPOLYMERS SUITABLE FOR CROSSLINKING

Henri Fassy, Mazeres-Lezons, Philippe Lalet, Orthez, and Andre Miletto, Pau, France, assignors to Societe Anonyme dite: Aquitaine-Total Organico, Tour Aquitaine, Courbevoie, France
No Drawing. Filed Dec. 21, 1971, Ser. No. 210,605
Claims priority, application France, Dec. 23, 1970, 46,488
Int. Cl. C08f *15/32, 15/40*
U.S. Cl. 260—87.5 R       11 Claims

ABSTRACT OF THE DISCLOSURE

This invention concerns new vinyl resins obtained by polymerizing vinyl chloride in the presence of unsaturated aliphatic monocarboxylic acids, in which the double bond is at one end of the chain, and containing between 10 and 20 carbon atoms.

The invention also concerns crosslinked vinyl resins obtained by treating the carboxyl polymers according to the invention with polyvalent, and preferably bivalent, metal salts.

The vinyl chloride is preferably polymerized in an aqueous suspension, in the presence of from 1 to 10% weight of undecylenic acid.

The product obtained is particularly suitable for crosslinking.

Crosslinked polymers according to the invention have greater heat stability, and withstand fatigue and flow, which means that they can be used in building.

---

This invention concerns new vinyl resins obtained by polymerizing vinyl chloride in the presence of certain unsaturated monocarboxylic acids, such as undecylenic acid. It also concerns the polymerization processes used in preparing these new copolymers. Finally, the invention relates to crosslinked vinyl resins obtained by treating the carboxyl polymers concerned in the invention with polyvalent, and preferably bivalent, metal salts.

The properties of existing vinyl chloride resins allow them to be used in many sectors. However, their capacity to resist heat, flow and fatigue is often inadequate, so that certain applications are inadvisable.

Previous attempts to overcome these drawbacks have involved adding stabilizing agents to vinyl chloride homopolymer resins, or by copolymerizing vinyl chloride with other vinyl monomers such as acrylic acid, alkyl acrylates, alkyl fumarates or alkyl-vinyl-ethers.

These methods often help to improve some of the properties, particularly heat stability, but they nearly always affect the others unfavorably. The products obtained therefore cannot be used in certain fields where resistance to flow and fatigue is necessary, such as the building trade.

The strength of vinyl resins can be improved by crosslinking reactions, but in the case of polyvinyl chloride, these reactions are seldom applied industrially, since they almost always involve major disadvantages. Crosslinking reactions often result in degradation of the polymers, and require complicated processes which are difficult to perform, or relatively scarce or expensive chemicals.

One attempted method of obtaining crosslinked polyvinyl chloride consists of polymerizing vinyl chloride in the presence of acrylic acid, and then treating the resulting copolymer with bivalent metal salts, to create ionic bonds between the chains. The expected reaction does not in fact occur, resistance to fatigue fails to increase, and heat stability is lower than that of a vinyl chloride homopolymer.

Vinyl chloride has also been polymerized in emulsion form in the presence of unsaturated fatty acids such as oleic or ricinoleic acid, which act as emulsifying agents. A reaction can be produced, after polymerization, between these fatty acids and alkaline earth or heavy metal salts, such as cadmium and zinc sulphate, thus converting them into known lubricants or stabilizing agents. These post-polymerization treatments do not produce any cross-linking in the form of ionic bonds between the chains, however, since polymerization has occurred in the presence of unsaturated fatty acids, which do not polymerize because the double bonds are inside the chain, so that the product obtained is actually a vinyl chloride homopolymer mixed with fatty acids. The post-polymerization reaction therefore has no direct effect on the polymer, but converts the fatty acids into metallic fatty acid salts used as lubricants or stabilizing agents.

The present invention concerns new vinyl chloride copolymers with greater heat stability, impact strength, adherence to metal surfaces, and, in particular, suitability for crosslinking, without other properties being affected unfavorably. This considerably widens the field of application of vinyl chloride-based resins. The invention also concerns new crosslinked copolymers with increased heat stability an more resistance to flow and fatigue.

Copolymers according to the invention are obtained by polymerizing vinyl chloride in the presence of unsaturated aliphatic monocarboxylic acids in which the double bond is at one end of the chain, and containing from 10 to 20, and preferably 10 to 15, carbon atoms. The use of linear monocarboxylic acids with the formula

$$CH_2=CH-(CH_2)_n-COOH,$$

where $n$ is between 7 and 17, and preferably between 7 and 12, is particularly recommended. Especially satisfactory results are obtained when $n$ equals 8, in other words when undecylenic acid is used.

Part of the vinyl chloride present in the copolymer may also be replaced by other monomers. These include vinylidene chloride, acrylonitrile, acrylic and methacrylic esters such as methyl methacrylate, vinyl esters such as vinyl acetate, and vinyl ethers such as lauryl-vinyl-ether.

The present invention also concerns the graft copolymers obtained by polymerizing vinyl chloride and monocarboxylic acids in the presence of polymers such as chloro butyl rubber, ethylene-propylene-diolefin terpolymers, polybutadiene and its copolymers, butyl rubber and polyisoprene and its copolymers.

Vinyl chloride is always the major ingredient in the polymers obtained. The unsaturated acid content is usually below 20% of the weight of copolymer, and preferably not more than 10%. In practice, the most useful products of this kind contain from 0.5 to 5% weight of unsaturated monocarboxylic acids.

The process according to the invention consists of polymerizing vinyl chloride in the presence of unsaturated monocarboxylic acids with a double bond at one end of their chain, and containing from 10 to 20 carbon atoms. These acids form a minor ingredient of the reaction mixture, usually not more than 30%, and preferably 1 to 10%. It should be remembered, however, that because of its lower reactivity, the unsaturated acid content of the copolymer will be lower than the amount in the reaction mixture before polymerization.

Standard vinyl chloride polymerization techniques can be used for the process.

The reaction may take place in a solution, an emulsion or a suspension, or in bulk. Preferably an aqueous suspension should be used.

The process according to the invention can be performed in conventional polymerization apparatus. The copolymers can be prepared at pressures of less than 20 atmospheres, and at temperatures generally between 30 and 80° C.; the recommended pressure is preferably between 4 and 14 atmospheres, and the temperature between 40 and 70° C.

The most suitable way of implementing the present invention is to polymerize the monomers in an aqueous suspension, under the temperature and pressure conditions mentioned above, and in the presence of radical-type catalysts, surfactants, suspension agents, and, if necessary, a buffer product.

The suspension agents include products such as polyvinyl alcohol, methyl-cellulose, or hydroxypropyl-cellulose.

The surface-active agents may be sulphates, sulphonates or sulpho-succinates.

In certain cases a buffer product, such as disodic phosphate or sodium acetate, may also be added.

The catalysts may be peroxides or peresters, such as benzyl peroxide, lauryl peroxide, azo-bis-isobutyronitrile, azo-bis-valeronitrile, alkyl perpivalates, acetyl-cyclo-hexane-sulphonyl peroxide, chloro-benzyl peroxide, alkyl or cycloalkyl peroxycarbonates, or combinations of these catalysts with one another or with other radical-type catalysts.

The amounts used range from 0.05 to 5%, and preferably 0.1 to 1%, of the weight of monomers.

As already mentioned, the vinyl chloride and unsaturated acids can be polymerized in the presence of other monomers or polymers, provided that the reaction mixture of monomers and possibly polymers contains at least 50% vinyl chloride. These other monomers include other vinyl and vinylidene halides, acrylonitrile, acrylic and methacrylic esters, and vinyl esters and ethers. Polymers include all elastomers, particularly chloro-butyl rubbers, ethylene-propylene-diolefin terpolymers, and butadiene and isoprene homopolymers and copolymers.

In performing the process, a solution of surface-active and suspension agents is first prepared, and the buffer product is dissolved in it. The solution is placed in the polymerization container, which is then drained of air, and the catalyst and monomers are added.

All the vinyl chloride may be placed in the container at the beginning of the reaction, or added continuously or intermittently during the reaction, the amount being regulated so that the reactor always contains vinyl chloride monomer.

Polymerization may also be carried out in two stages, the first at a lower temperature than the second.

The temperature may also be raised gradually during polymerization instead of keeping it at one or more predetermined fixed levels.

Other operating methods can also be used: for example, the vinyl chloride may be polymerized in bulk with the catalysts mentioned above. Another method consists of emulsion polymerization, in which the monomers are polymerized in the presence of emulsifying agents, using water-soluble catalysts, such as hydrogen peroxide and ammonium persulphate. The quantity of catalysts used is from 0.01 to 5% and preferably 0.02 to 1%, of the weight of monomers.

The new copolymers according to the invention have improved properties, as regards heat stability, adherence to metal surfaces and, particularly, suitability for crosslinking.

The invention also concerns the crosslinked resins obtained by treating vinyl chloride and long-chain unsaturated acid copolymers with substances creating bonds between the chains, by reacting with the carboxylic functions. These substances include diamines, compounds containing polyvalent metal cations, and, in general, any compounds with an affinity for organic acids. Preferably, salts of bivalent metals such as lead, magnesium, cadmium, zinc and alkaline-earth metals, are used, in particular tribasic lead sulphate, calcium chloride, zinc sulphate, barium sulphate, and cadmium sulphate. The amount used naturally depends on the level of carboxyl functions in the copolymer, but it is usually between 0.5 and 10%, and preferably between 2 and 5% of the weight of copolymer.

Crosslinked copolymers according to this invention are preferably obtained by mixing the copolymer with a bivalent metal salt, in quantities of between 0.5 and 10% of the weight of copolymer, both ingredients being prepared first in powder form. Plasticizers, stabilizing agents, lubricants, coloring agents, pigments and filler can be added to the mixture, which is then passed between rollers, at temperatures of 100 to 200° C., and preferably 120 to 160° C. The degree of crosslinking of the resulting product depends on the temperature and duration of rolling.

Crosslinked copolymers according to this invention have good heat stability and are flow- and fatigue-resistant. They can be used in building, for extruded sections with increased strength, and for injection-moulding of fatigue- and flow-resistant components.

The following examples illustrate the invention, without its being in any way confined to them.

EXAMPLE 1

The following ingredients are placed in turn in a glass-lined reactor with double casing:

80 kg. mineral-free water;
3 litres of an aqueous solution of 25 g. per litre polyvinyl alcohol with a saponification rate of 80% and viscosity of 35 centipoises, measured in water at 4% and at 20° C.;
450 g. undecylenic acid, 1% of the amount of vinyl chloride;
45 g. of lauryl peroxide, 0.1% of the amount of vinyl chloride;
600 cc. of a solution of 80 g. per litre of disodic phosphate.

The reactor is closed, and the stirrer switched on, at 220 r.p.m.

The reactor is drained of air, and 45 kg. of vinyl chloride are added. The temperature is raised to 64° C., pressure being kept at approximately 10 atmospheres.

After 12 hours' polymerization, 34 kg. of a white powder are obtained, with the appearance of an ordinary polyvinyl chloride. It is placed in a drying oven for 15 hours at 60° C. The conversion rate is 76%.

The product obtained has a viscosity index of 80 (according to ISO R-174), and 0.5% undecylenic acid, measured by infra-red spectrophotometry.

It is characterized by excellent heat stability, and by its suitability for crosslinking.

EXAMPLES 2, 3 AND 4

A series of tests is performed, using the same method as for Example 1, but with different percentages of undecylenic acid. These percentages, and properties of the products, are given in the table below.

| Examples | 2 | 3 | 4 |
|---|---|---|---|
| Percentage of undecylenic acid in relation to vinyl chloride | 2 | 5 | 10 |
| Conversion rate | 73 | 66 | 64 |
| Viscosity index (ISO R-174) | 83 | 66 | 54.8 |
| Percentage of undecylenic acid in final product | 1.1 | 2.2 | 3.2 |

All the polymers obtained have good heat stability, and are suitable for crosslinking.

EXAMPLE 5

The same method is followed as in Example 1, but using 45 g. of tertio-butyl-cyclohexyl (0.1% of the amount of vinyl chloride), and 2,250 g. of undecylenic acid (5% of the amount of vinyl chloride). Polymerization continues for 20 hours, at a temperature of 50° C. A yield of 63% of resin is obtained, with a viscosity index of 93.6 (ISO R-174). The polymer contains 1.5% undecylenic acid.

Like those for previous examples, this resin possesses excellent heat stability, and its particularly suitable for cross-linking.

EXAMPLE 6

100 parts of the resin obtained in Example 2 are mixed with 4 parts tribasic lead sulphate (Sicostab D 15) and 0.5 part polyethylene wax of low molecular weight ("E Wax").

Similarly, 100 parts polyvinyl chloride homopolymer, with the same viscosity index as the copolymer, are mixed with 4 parts tribasic sulphate and 0.5 part of the same polyethylene wax.

Test-samples are prepared in a press, as follows. The plates of the press are heated to 170° C. for 5 minutes, without pressure during the first 3, and with a pressure of 100 kg./sq. cm. for the last 2. The press is then allowed to cool for 5 minutes with the pressure maintained.

After conditioning for 48 hours in an air-conditioned room at 20° C., with 60% humidity the samples undergo tensile tests as follows:

Force scale: 200 DAN (Decanewton);
Speed of traction: 50 mm./minute;
Distance between jaws: 50 mm.

The samples also undergo fatigue tests, as follows. Tensile force is applied, without going far enough to cause breakage; the force is then released and the cycle repeated until the sample breaks. The stress is determined according to the breakage curve, and is approximately 90% of the deformation stress. The speed of traction and release is 10 mm. per minute.

To assess heat stability, the products are mixed in a roller-mixer at 190° C., with a friction coefficient of 1.2. A fairly good idea of the heat stability of the product may be obtained from its surface appearance after mixing.

The results are given in the table below:

| Properties | Sample | |
|---|---|---|
| | Vinyl chloride/ undecylenic acid copolymer | PVC polymer |
| Heat stability | Good | Good |
| Yield point in kg./sq. cm | 790 | 610 |
| Breaking load in kg./sq. cm | 590 | 430 |
| Percent elongation | 15 | 30 |
| Number of cycles (hysteresis) | 200 | 5 |

These results show that the fatigue-resistance (hysteresis) and flow-resistance (elongation) of the copolymer are much better than for the homopolymer, and that heat stability is satisfactory.

EXAMPLE 7

Using the same method as in Example 6, in other words mixing 100 parts polymer with 4 parts tribasic lead sulphate and 0.5 part E wax, the properties of a vinyl chloride homopolymer and a vinyl chloride/acrylic acid copolymer containing 5% acrylic acid are compared. The polymers have the same viscosity index and undergo the same tests as in Example 6.

The results are given in the table below.

| Properties | Sample | |
|---|---|---|
| | Vinyl chloride/ undecylenic acid copolymer | PVC polymer |
| Heat stability | Poor | Good |
| Yield point in kg./sq. cm | 645 | 620 |
| Breaking load in kg./sq. cm | 535 | 500 |
| Percent elongation | 55 | 60 |
| Number of cycles (hysteresis) | 20 | 20 |

These results shown that the fatigue- and flow-resistant properties of the vinyl chloride/acrylic acid copolymer are no better than those of the vinyl chloride homopolymer. In addition, it has poor heat stability.

What is claimed is:

1. Normally solid, linear, heat stable, addition copolymers of vinyl chloride and at least about 0.5 weight percent of an unsaturated monocarboxylic monoethylene aliphatic acid having the formula $$CH_2=CH-(CH_2)_n-COOH$$

wherein $n$ is a positive integer between 7 and 17, said polymer containing at least 50 weight percent vinyl chloride.

2. Vinyl chloride copolymers according to claim 1, in which the unsaturated acid contains from 10 to 15 carbon atoms.

3. Vinyl chloride copolymers according to claim 1, in which the unsaturated acid has the formula $$CH_2=CH-(CH_2)_n-COOH$$

where $n$ is between 7 and 12.

4. Vinyl chloride copolymers according to claim 1, in which the unsaturated acid is undecylenic acid.

5. Vinyl chloride copolymers according to claim 1, containing not more than 20% weight of unsaturated acid.

6. Vinyl chloride copolymers according to claim 5, containing not more than 10% weight of unsaturated acid.

7. Vinyl chloride copolymers according to claim 6, containing between 0.5 and 5% weight of unsaturated acid.

8. Vinyl chloride based polymers according to claim 1, in which the vinyl chloride is partly replaced by another monomer, while still constituting more than 50 weight percent of the terpolymer.

9. Vinyl chloride based polymers according to claim 8, in which the other monomer is acrylonitrile, vinylidene chloride, an acrylic or methacrylic ester, vinyl acetate or lauryl-vinyl-ether.

10. Crosslinked polymers, obtained by reacting polymers according to claim 1 with compounds having an affinity for organic acids to create bonds between the chains of said polymers by reaction with carboxylic acid functional groups in said polymers.

11. Crosslinked polymers, according to claim 10 wherein the crosslinking compounds are bivalent metal salts.

References Cited

UNITED STATES PATENTS 3,166,534   1/1965   Perrins _____ 260—80.5
3,404,134   10/1968  Rees _____ 260—78.5

STANFORD M. LEVIN, Primary Examiner

U.S. Cl. X.R.

260—80.76, 80.77, 80.8, 878 R, 884